US011117680B2

(12) United States Patent
Walsh et al.

(10) Patent No.: US 11,117,680 B2
(45) Date of Patent: Sep. 14, 2021

(54) LANDING PAD FOR UNMANNED AERIAL VEHICLE DELIVERY

(71) Applicants: Ryan Walsh, Aurora, IL (US); Alex J. Falesch, Oswego, IL (US)

(72) Inventors: Ryan Walsh, Aurora, IL (US); Alex J. Falesch, Oswego, IL (US)

(73) Assignee: Valqari Holdings, LLC, Batavia, IL (US)

( * ) Notice: Subject to any disclaimer, the term of this patent is extended or adjusted under 35 U.S.C. 154(b) by 393 days.

(21) Appl. No.: 16/121,174

(22) Filed: Sep. 4, 2018

(65) Prior Publication Data
US 2019/0002129 A1     Jan. 3, 2019

Related U.S. Application Data

(63) Continuation of application No. 14/587,828, filed on Dec. 31, 2014, now Pat. No. 10,124,912.
(Continued)

(51) Int. Cl.
*B64F 1/00*     (2006.01)
*B64F 1/32*     (2006.01)
(Continued)

(52) U.S. Cl.
CPC .............. *B64F 1/32* (2013.01); *A01M 29/16* (2013.01); *A47G 29/14* (2013.01); *B64C 39/024* (2013.01);
(Continued)

(58) Field of Classification Search
None
See application file for complete search history.

(56) References Cited

U.S. PATENT DOCUMENTS

| 2,900,046 A | 8/1959 | Bailey |
| 4,706,407 A | 11/1987 | Melton |

(Continued)

FOREIGN PATENT DOCUMENTS

| CN | 2857710 Y | 1/2007 |
| CN | 102067183 A | 5/2011 |

(Continued)

OTHER PUBLICATIONS

Examination Report dated May 9, 2019 in connection with Australian application No. 2018205156.
(Continued)

*Primary Examiner* — Truc M Do
(74) *Attorney, Agent, or Firm* — Cook Alex Ltd.; Ryan M. Truesdale

(57) ABSTRACT

A landing pad receives and stores packages delivered from an aerial vehicle are awaiting pickup from an aerial vehicle. The landing pad can be placed outside of a window and can contain a transmitter for sending out an identification signal via radio frequency to aid aerial vehicles in finding the landing pad. The landing pad contains a landing platform with a trapdoor that leads to a storage compartment. The trapdoor can be configured to only open when it receives a signal from an authorized aerial vehicle. The storage compartment can be accessed via a storage compartment door which can contain a locking mechanism. The storage compartment can be climate controlled. The landing pad can also have a transmitter that emits sounds to discourage animals from nesting on or near the landing pad. The landing pad can also include a solar power generator as a source of electrical energy.

20 Claims, 17 Drawing Sheets

Related U.S. Application Data

(60) Provisional application No. 61/923,207, filed on Jan. 2, 2014.

(51) Int. Cl.
  G05D 1/02 (2020.01)
  B64C 39/02 (2006.01)
  A01M 29/16 (2011.01)
  A47G 29/14 (2006.01)
  B64F 1/04 (2006.01)

(52) U.S. Cl.
  CPC ............ B64F 1/04 (2013.01); G05D 1/0202 (2013.01); *B64C 2201/027* (2013.01); *B64C 2201/128* (2013.01); *B64C 2201/145* (2013.01)

(56) References Cited

U.S. PATENT DOCUMENTS

| | | |
|---|---|---|
| 5,435,484 A | 7/1995 | Carlson |
| 5,624,071 A | 4/1997 | Sosan |
| 5,667,136 A | 9/1997 | Chen |
| 5,774,053 A | 6/1998 | Porter |
| 5,797,497 A | 8/1998 | Edwards |
| 5,979,750 A | 11/1999 | Kindell |
| 6,802,263 B1 | 10/2004 | Kolb |
| 6,859,005 B2 | 2/2005 | Boliver |
| 7,023,399 B2 | 4/2006 | Zaretsky et al. |
| 7,162,330 B2 | 1/2007 | Mayer |
| 7,854,374 B2 | 12/2010 | Dudley |
| 8,915,498 B2 | 12/2014 | Hynds |
| 9,211,025 B1 | 12/2015 | Elhawwashy |
| 9,840,340 B2 | 12/2017 | O'Toole |
| 2001/0020619 A1 | 9/2001 | Pfeifer et al. |
| 2002/0169628 A1 | 11/2002 | Bauer |
| 2003/0205979 A1 | 11/2003 | Papari et al. |
| 2005/0230397 A1 | 10/2005 | Yang et al. |
| 2006/0113368 A1 | 6/2006 | Dudley |
| 2007/0028506 A1 | 2/2007 | Lester |
| 2007/0145057 A1 | 6/2007 | Nance |
| 2007/0257036 A1 | 11/2007 | Nance |
| 2009/0084836 A1 | 4/2009 | Dudley |
| 2009/0194532 A1 | 8/2009 | Yang et al. |
| 2009/0240511 A1 | 9/2009 | Darrouzet |
| 2010/0012769 A1 | 1/2010 | Alber et al. |
| 2011/0006060 A1 | 1/2011 | Lin |
| 2012/0080556 A1 | 4/2012 | Root |
| 2014/0032034 A1* | 1/2014 | Raptopoulos ........ G05D 1/0088 701/25 |
| 2015/0102903 A1 | 4/2015 | Wilkinson |
| 2015/0120094 A1 | 4/2015 | Gur |
| 2015/0158599 A1 | 6/2015 | Sisko |
| 2015/0175276 A1 | 6/2015 | Koster |
| 2016/0033966 A1 | 2/2016 | Farris et al. |
| 2016/0235236 A1 | 8/2016 | Byers et al. |
| 2017/0091710 A1 | 3/2017 | Van Dyke |

FOREIGN PATENT DOCUMENTS

| | | |
|---|---|---|
| CN | 102611200 A | 7/2012 |
| CN | 202476330 U | 10/2012 |
| CN | 202534057 U | 11/2012 |
| CN | 103198425 A | 7/2013 |
| CN | 103263218 A | 8/2013 |
| CN | 103264768 A | 8/2013 |
| CN | 103274047 A | 9/2013 |
| CN | 103274226 A | 9/2013 |
| CN | 103274226 A | 9/2013 |
| CN | 203325087 U | 12/2013 |
| CN | 203350749 U | 12/2013 |
| CN | 105848533 B | 4/2018 |
| DE | 4435155 A1 | 4/1996 |
| DE | 202014000236 U1 | 2/2014 |
| GB | 2330382 A | 4/1999 |
| SG | 182025 A | 7/2012 |
| SG | 182025 A1 | 7/2012 |
| WO | 9919591 A1 | 4/1999 |
| WO | WO 9919591 A1 | 4/1999 |
| WO | 2007141795 A1 | 12/2007 |
| WO | WO 2007141795 A1 | 12/2007 |
| WO | 2008153269 A1 | 12/2008 |
| WO | WO 2008153269 A1 | 12/2008 |
| WO | 2012094430 A1 | 7/2012 |
| WO | WO 2012094430 A2 | 7/2012 |
| WO | 2015061008 A1 | 4/2015 |
| WO | WO 2015061008 A1 | 4/2015 |
| WO | 2016094067 A1 | 6/2016 |
| WO | WO 2016094067 A1 | 6/2016 |

OTHER PUBLICATIONS

First Office Action dated Aug. 6, 2019 in connection with Chinese Patent Application No. 201810285497.4.
The Office Action dated Oct. 7, 2019 in connection with European Patent Application No. 17208328.9.
Third Office Action dated Aug. 28, 2020 in connection with Chinese Patent Application No. 201810285497.4.
First Office Action dated Sep. 30, 2020 in connection with Chinese Patent Application No. 201810285496.X.
Examination Report dated Dec. 20, 2018 in connection with Australian application No. 2018205156.
Office Action dated Jan. 30, 2017 "0130CA".
Office Action dated May 12, 2017 "0512CA".
PCT/2018/033059 International Search Report and Written Opinion dated Sep. 5, 2018 "0905ISR".
David Gianatasio, What Every House Needs: A Century 21 Branded Landing Pad for Amazon Drones, Adweek, Dec. 6, 2013, Retrieved from the Internet: http://www.adweek.com/adfreak/century-21s-landing-pad-will-help you-welcome-amazon-drone-delivery-154341.
International Search Report and Written Opinion dated Apr. 17, 2015 in connection with International Application No. PCT/US 2014/073031.
International Preliminary Report on Patentability dated Jul. 14, 2016 in connection with International Application No. PCT/US 2014/073031.
Office Action dated Jan. 30, 2017 in connection with Canadian Application No. 2,952,582.
Office Action dated May 12, 2017 in connection with Canadian Application No. 2,952,582.
Office Action dated May 26, 2017 in connection with Chinese Application No. 201480071450.8.
Office Action dated Sep. 1, 2017 in connection with European Application No. 14837087.7.
Examination Report No. 1 dated Jan. 9, 2018 in connection with Australian Application No. 2014373647.
Notice of Acceptance dated Apr. 19, 2018 in connection with Australian Application No. 2014373647.
Extended European Search Report dated Jun. 18, 2018 in connection with European Application No. 17208328.9.
International Search Report and Written Opinion dated Sep. 5, 2018 in connection with PCT/US2018/033059.
David Gianatasio, What Every House Needs: A Century 21 Branded Landing Pad for Amazon Drones, Adweek, Dec. 6, 2013, Retrieved from the Internet: http://www.adweek.com/adfreak/century-2Is-landing-pad-will-helpyou-welcome-amazon-drone-delivery-154341.
Second Office Action dated Mar. 18, 2020 in connection with Chinese Patent Application No. 201810285497.4.
Office Action dated Dec. 9, 2020 in connection with Australian Patent Application No. 2019283980.
Office Action dated Dec. 9, 2020 in connection with European Patent Application No. 18733018.8.

* cited by examiner

LANDING PAD FOR UNMANNED AERIAL VEHICLE DELIVERY

CROSS-REFERENCE TO RELATED APPLICATIONS

This application is a continuation of U.S. application Ser. No. 14/587,828 filed on Dec. 31, 2014, entitled "Landing Pad for Unmanned Aerial Vehicle Delivery" which, in turn, claims priority benefits from U.S. Provisional Application Ser. No. 61/923,207 filed on Jan. 2, 2014, also entitled "Landing Pad For Receiving Packages From Unmanned Aerial Vehicles". The '828 and '207 applications are hereby incorporated by reference herein in their entireties.

FIELD OF THE INVENTION

The present invention relates to the use of a landing pad to send/receive packages via unmanned air aerial vehicles, also frequently referred to as drones. One embodiment involves mounting the device in a window so that it can be used by those living in high-rises.

BACKGROUND OF THE INVENTION

Online or remote shopping has grown immensely over the past decade and now accounts for over 8% of items sold, with sales topping $226 billion in 2012 and expected to climb to $327 billion by 2016. Remote shopping offers many benefits including: allowing customers to shop from literally anywhere in the world; eliminating the costs associated of having to ship, store, and sell items from traditional retail store locations; and allowing manufacturers and distributors to reach a larger target market. With the growth of Cyber Monday, the trend of increased online or remote shopping has increased unequivocally.

However, despite these advantages, remote shopping is not without its drawbacks. Most prominent among such drawbacks is the lag time between purchasing an item and having it delivered. With the exception of digital goods that can be downloaded over the internet, most goods purchased by remote shopping need to be delivered to the users home or business. This usually takes days, if not weeks, and is subject to the intrinsic costs, hazards and obstacles of traditional parcel delivery. The variability in timeframes and distance is due to the inherent drawbacks of the current logistics and transportation models.

Companies are attempting to minimize the delay between purchase and delivery by offering same day delivery in certain cities. However, this can be very costly and inefficient as it requires a large number of individuals on call to go out and deliver items as they are purchased. Not only does this increase the delivery cost, but also increases traffic congestion and carbon emissions, as there are more people out making deliveries.

One suggestion in improved delivery service that does not have the draw backs of conventional same day delivery, is the use of unmanned aerial vehicles/drones. Low flying drones, such as quadcopters and octocopters, can be used to carry and deliver small to medium sized packages, directly to known locations, using global positioning system technology, telemetry, metadata and/or commands from a remote operator. Once purchased, these drones promise to be much more cost effective than human delivery, and will likely be faster as they can bypass traffic and are not limited to following paved roads.

As consumer demand for same day delivery rises, drones will rapidly become a viable technology for many delivery services and companies. Companies implementing drones will reach a greater market with less overhead and lower costs than companies using conventional delivery methods.

Despite its many advantages, one of the potential problems of using drones to deliver packages is that their use will increase package theft. This problem arises from the fact that drones are visible from the ground and typically have shorter ranges than traditional truck delivery. Potential thieves will be able to follow drones to their destination and steal the package after it has been left at the recipient's doorstep.

Another problem with using drones to deliver packages arises when the destination for the package is an area with a high density population. In an area with high-rises housing thousands of tenants and busy streets, packages simply cannot be left in front of buildings. Not only would this encourage theft, but it would also create a public safety hazard as doors and streets would quickly become blocked. Currently this problem is dealt with by having a doorman for a building accept packages for the building's tenants. However, this current setup will not work with drones, as drones are incapable of opening doors or ringing bells.

Another issue in utilizing drones for package delivery is that obstacles, such as low hanging branches or covered porches, can make it impractical if not impossible to deliver goods to the ground level. and will create a myriad of variables that could lead to either more expensive delivery due to the increased need for sensors on the drones, or prevent certain areas from being capable of receiving deliveries. Many of these problems will not be known until the drone reaches the delivery location, further compounding the problem.

With Amazon announcing a standardized form of drone delivery with Amazon PrimeAir, other delivery services will soon begin adopting the new form of delivery. With the ability to revolutionize the delivery service, it is imperative that the proper infrastructure is developed to ensure the successful implementation of drone delivery. What is needed is a device that accepts packages from a drone and is secure from potential thieves.

SUMMARY OF THE INVENTION

A landing pad with a secure storage compartment or box can be used to provide a convenient and safe place for drones to deliver and/or pick up packages. The landing pad can be configured to fit into a standard window, so that it is more accessible to drones, and less accessible to thieves. The landing pad can also be configured to stand alone, either on a rooftop or in a field.

The drone landing pad can be secured to a standard sized window similar to an adjustable window based air conditioning unit. In some embodiments, the landing pad can have some adjustability to meet a larger variety of window sizes. The portion that faces into the building can have the digital interface as well as the door to the lockable compartment. The landing pad then protrudes from the window towards the outside; creating a platform for the drone to land as well as to secure the package once it is delivered and/or before it is picked up.

The method in which the landing pad is mounted to the building includes, but is not limited to: brackets; adhesives; magnets; or other methods of securing the landing pad to the building. With many large buildings and condominium/apartment developments having stringent rules and codes concerning the application of exterior hardware, the method of mounting and securing the pad to the window can have the options listed above to allow the maximum number of people to benefit from this technology.

In some embodiments the outside surface(s) of the landing pad can contain LED or other display panel(s). This allows the landing pads to display information such as clocks, advertisements, and/or be decorative features. In some embodiments, multiple landing pads can be placed on the same building and networked together to create visual designs, much like high-rise buildings often black out certain windows to form words and/or designs.

Power for the landing pad can come from solar energy, battery energy, electricity from a wall outlet, or any other method of delivering energy including but not limited to combinations of the listed power sources.

In some embodiments, the landing pad can act as a charging station for the air drone. Various methods for changing the drone could be used including inductive charging, and/or directly allowing the drone to plug into the landing pad. By allowing drones to charge at the landing pad, drones will be able to make longer trips and/or carry heavier loads.

In one embodiment, the landing pad contains a transmitter that transmits, via radio frequency, a unique ID to help a drone identify it. After identifying the landing pad, the drone proceeds to the landing platform, which extends from a window, lands and releases its package. The landing pad, receiving a signal from the drone that the package has been delivered, opens a trapdoor on the landing platform so that the package can enter a storage compartment. In an alternative embodiment, the trapdoor is opened before the package is actually delivered, to lessen the chance that it is dislodged or removed, from the secure location within the landing platform.

A storage door, located on the landing pad opens into the building and allows access to the storage compartment. In some embodiments, the storage door includes a lock to lessen the chance that the package is stolen. The lock can be accessible through digital means such as pass code, pin or biometric scanning such as finger print recognition or retinal scan; or the lock can be accessible through mechanical means such as a key. Opening of the secured storage compartment can occur through the device itself, or can be opened remotely such as through a smart phone based application that can remotely configure, secure, or open the device.

One optional feature that can be included in the design and method of the device is the option to notify the recipient of the package's arrival through the means of text message or email notification in addition to the signal on the device itself or integrated into a home smart system.

Another optional feature is that the landing pad can be climate controlled. Various elements of the storage compartment that can be controlled include, but are not limited to, the temperature, humidity, and light settings. Traditional climate control mechanisms, including air-conditioners, electric and gas heaters, infrared heaters, dehumidifiers and/or humidifiers can be used. In some embodiments various insulating materials can be used to make the landing pad more efficient.

In at least one embodiment, the landing pad can be configured to change the climate of its storage box based on the item being dropped off and/or picked up. For example, in some instances if an item that should be kept warm is being dropped off, such as a pizza, the landing pad can be configured to keep the storage box warm so the item is ready when the individual gets home. Similarly, when an item that should be kept cool, such as certain medications, is being dropped off the storage box can be kept cool. In other or the same embodiments, the storage box can receive information about the item being dropped off from a variety of sources including, but not limited to, the user, a network, and/or the drone.

In some embodiments, the landing pad can be configured to adjust the climate based on user input. For example, in one embodiment, refrigerated food can be dropped off during the morning when an individual is at work. The landing pad, having received the food, can keep the food refrigerated until the user gets home, or the user tells the landing pad, either via a physical signal and/or electrical signal that the landing pad should heat up the food. In this way, refrigerated food can be delivered, stored, and cooked before the individual arrives home.

In some embodiments the landing pad can be configured to reduce wind resistance so as to prevent it from becoming detached during strong winds. In other or the same embodiments, the landing pad can be configured to fold into the window when not in use to minimize wind resistance.

The landing pad can be made of various materials, including but not limited to, aluminum, stainless steel, carbon fiber, and other rust resistant materials. The interior of the storage compartment can be made of a bacteria resistant material to prevent mold growth and to keep food sanitary.

DETAILED DESCRIPTION OF PREFERRED EMBODIMENT(S)

FIGS. 1, 2, 3 and 4 illustrate various viewpoints of the same landing pad 1.

Figure 1:
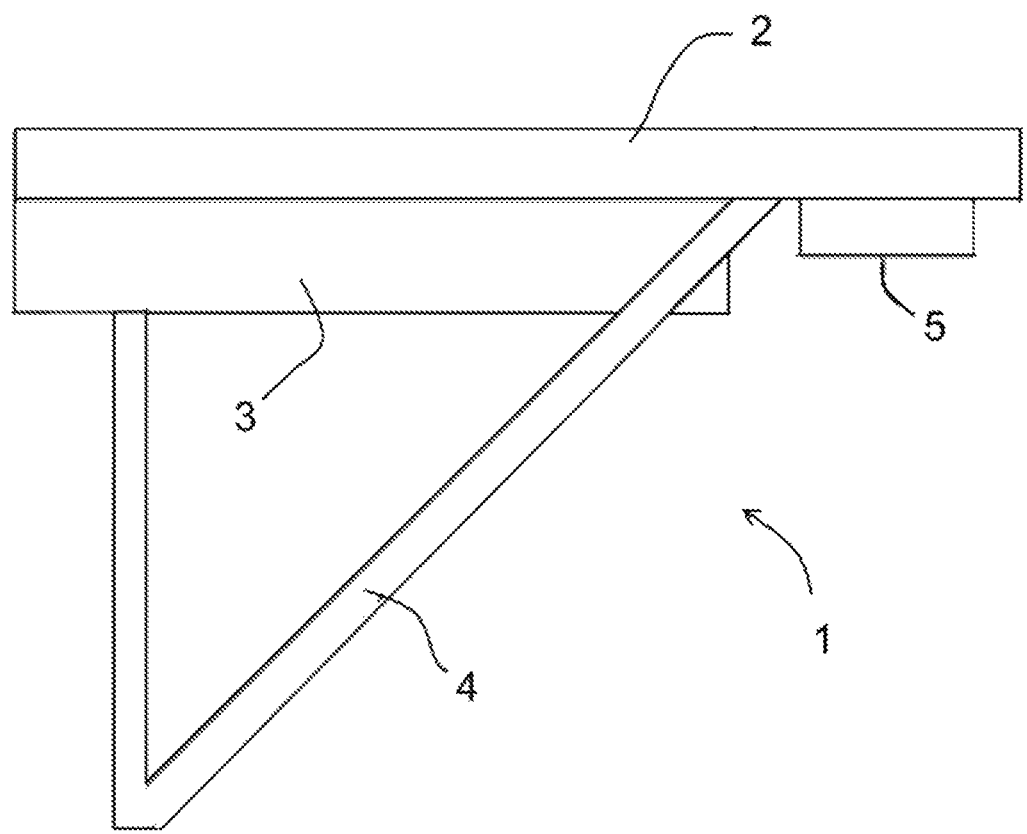
FIG. 1 is a side view of a landing pad.

FIG. 1 is a side view of landing pad 1. Landing pad 1 is designed to be inserted into a window, much like a window air-conditioner with the majority of landing platform 2 and storage compartment 3, protruding out of the window. In this way, a drone can land on landing platform 2 and deposit its package into storage compartment 3. A user can then retrieve the package via storage door 10 (see FIG. 2) which opens into the room.

Landing platform 2 and storage compartment 3 are supported by support brace 4 which can be attached to the exterior of a building. An optional transponder (not shown) can use radio frequency to emit a unique ID corresponding to landing pad 1 to aid the drone, along with GPS, in finding landing pad 1. This transponder can be housed with other electronics in electronic housing 5.

In some embodiments, storage compartment 3 includes a conveyer belt (not shown) which move packages either towards the window (not shown) after they have been delivered and/or away from the window when they are being picked up by the drone. In some embodiments, storage compartment 3 has a hydraulic system that tilts the floor of storage compartment 3 or the entire storage compartment, to help move any packages towards and/or away from the window.

Figure 21A:
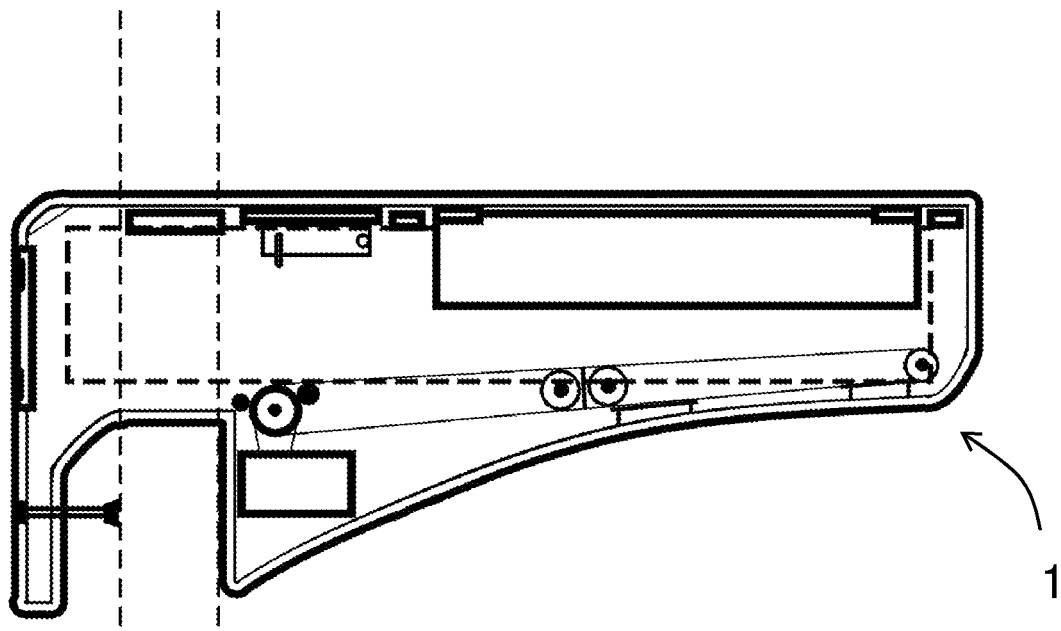
FIG. 21A is a side cutaway view of a landing pad with a hydraulic floor.

FIG. 21A shows landing pad 1 with a hydraulic floor in a lower position.

Figure 21B:
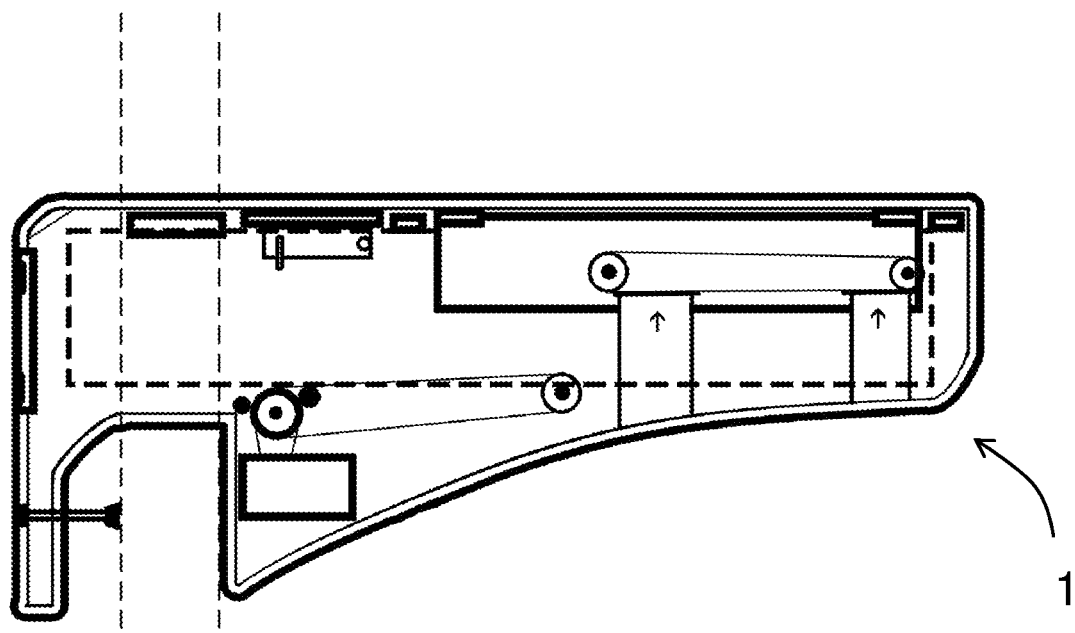
FIG. 21B is a side cutaway view of a landing pad with a hydraulic floor in which part of the floor is in a raised position.

FIG. 21B shows landing pad 1 with hydraulic floor in a raised position.

Figure 18A:
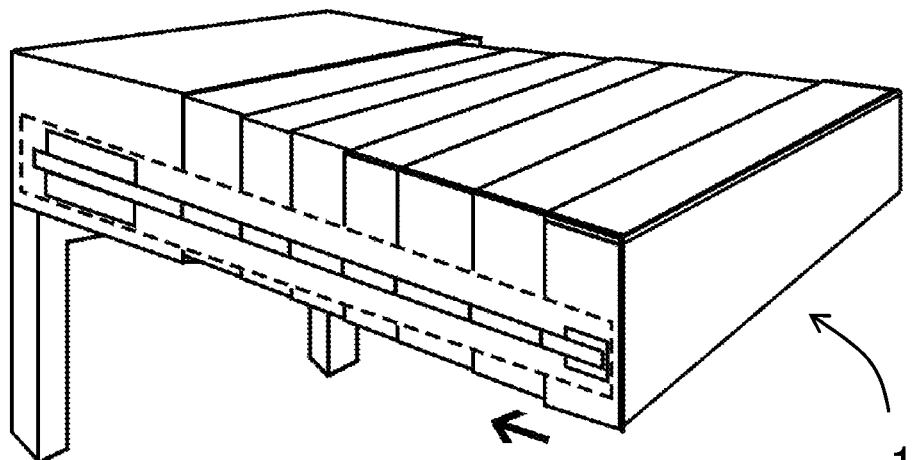
FIG. 18A is a side perspective view of an expandable landing pad in an expanded state.
Figure 18B:
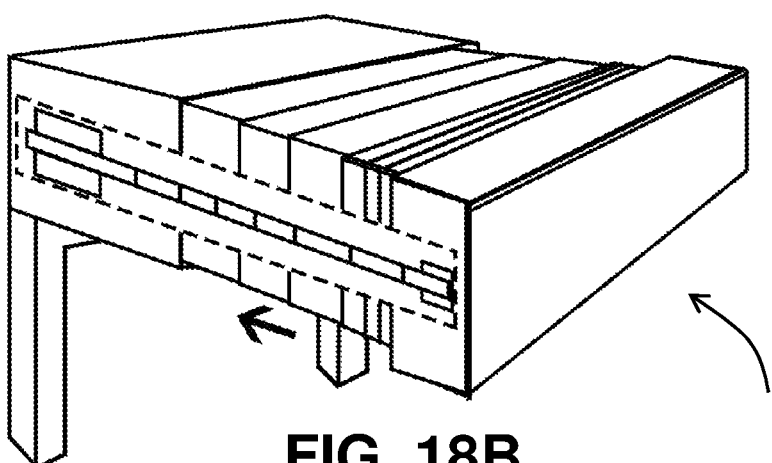
FIG. 18B is a side perspective view of an expandable landing pad in a semi-contracted state.
Figure 18C:
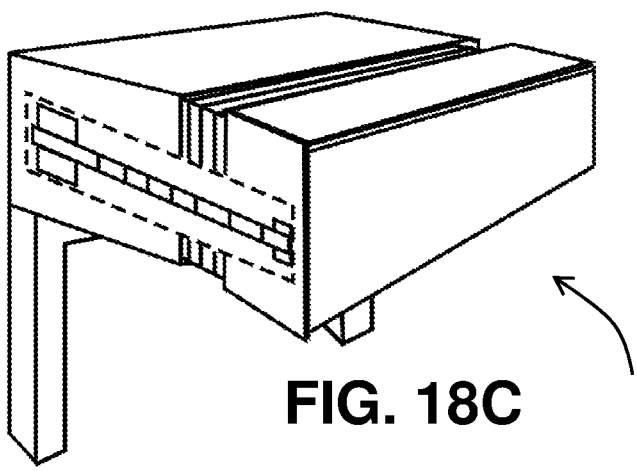
FIG. 18C is a side perspective view of an expandable landing pad in a contracted state.

In some embodiments, storage compartment 3 can be expandable to allow for larger packages, while decreasing wind resistance when storage compartment 3 is not in use. FIGS. 18A-18C show an embodiment of expandable landing pad 1 in various stages of contraction.

Figure 2:
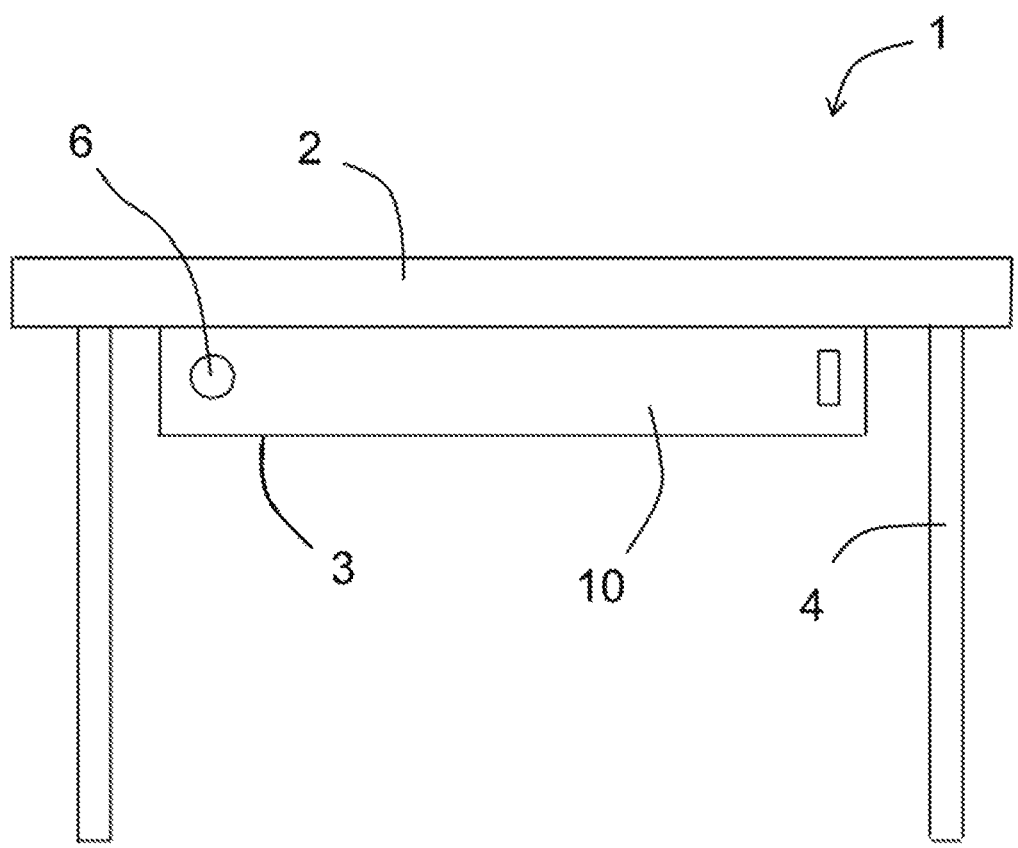
FIG. 2 is a back view of the landing pad in FIG. 1.

FIG. 2 shows a back view of landing pad 1, as would be seen by a user inside the building. Storage door 10 opens into the room, although it could also push into storage compartment 3, and allows for access into storage compartment 3.

An optional lock 6 can be applied to storage door 10 for added security. Lock 6 can be mechanical, electronic or both, and can be opened by a physical object such as a key, keycard, fingerprint (or other biometric identifier), by supplying a secret code such as via a keypad, or voice recognizer, or by a combination of both physical objects and secret codes. Lock 6 is especially useful if landing pad 1 is installed in a window facing a common room, such as a hallway or lobby in an apartment.

One can imagine floors of large skyscrapers being dedicated to drone delivery, in which residents have personal landing pads installed. Individuals can opt for this type of setup if they do not want landing pad 1 blocking the view from their personal window, or if they live too high or too low in a high-rise for effective drone delivery.

Figure 3:
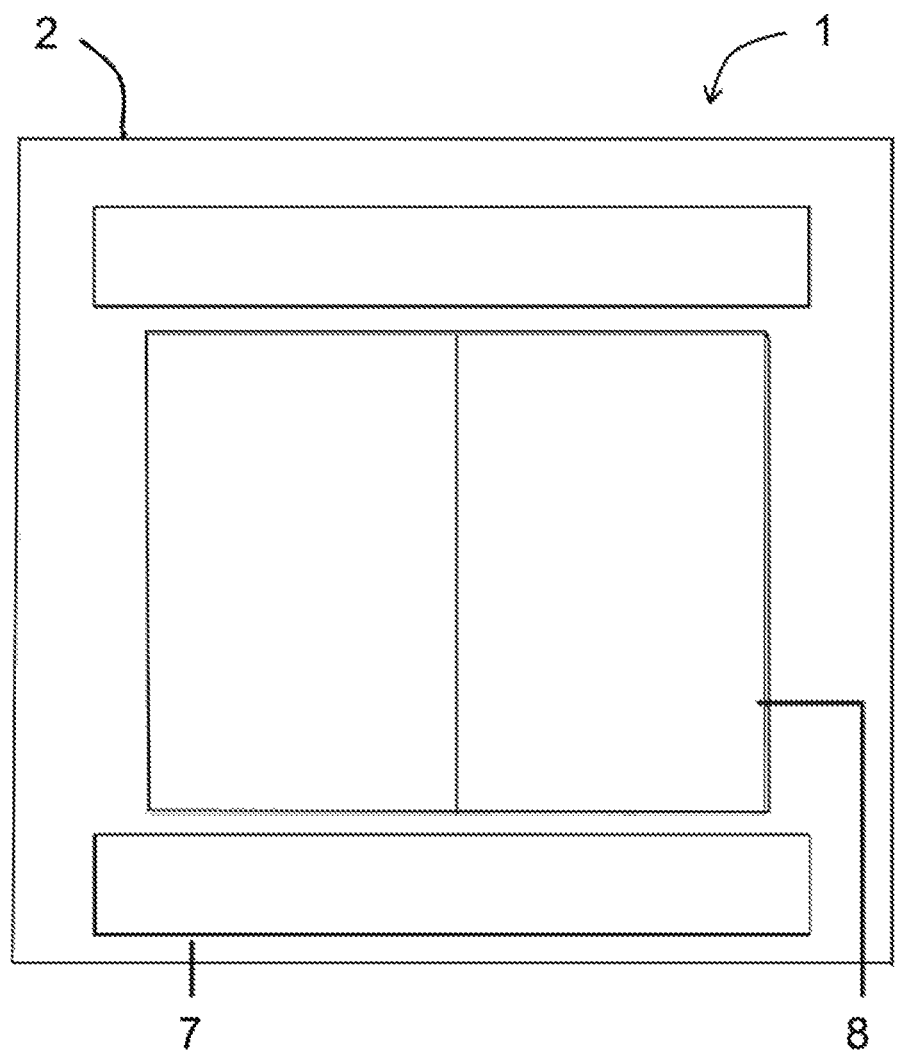
FIG. 3 is top view of the landing pad in FIG. 1.

FIG. 3 is a top view of landing pad 1. It illustrates trapdoor 8 on landing platform 2 which opens into storage compartment 3 when a drone leaves a package on landing platform 1. Trapdoor 8 can be spring loaded and activated via gravity. However, this can cause problems as it could allow animals, such as birds or squirrels to activate trapdoor 8 and find their way into users' homes. Furthermore, lightweight packages may not weigh enough to open trapdoor 8. Finally, if trapdoor 8 is allowed to freely swing open, thieves could easily steal from storage compartment 3, assuming landing pad 1 can be easily accessed.

To alleviate these problems, trapdoor 8 can be configured to be opened only via magnetic and/or mechanical means. In one embodiment, an air drone delivering a package sends a signal to landing pad 1, that the package is on landing platform 2 and it is safe to open trapdoor 8. This signal is received by a receiver (not shown) in electronic housing 5 and trapdoor 8 opens and then closes once the package is inside storage compartment 3.

In some embodiments, the signals being sent between the landing pad and air drones are encrypted to prevent thieves from hacking and replicating them.

FIG. 3 also illustrates optional solar paneling 7. While landing pad 1 can be powered via a myriad of ways, such as traditional electrical wiring running from the house or batteries, solar paneling 7 can be a highly efficient source of power for a variety of reasons. For one, solar paneling 7 will be receiving a full day of sunlight in many situations as it is located outside. Furthermore, landing pad 1 is dormant most of the time, except when sending out a unique ID from a transponder when an air drone is near or being engaged by the user and does not require a substantial amount of power.

Eliminating the need for external power allows for easier installation in areas without an electrical outlet nearby.

Landing pad 1 can also include a device in electric housing 5 that transmits a frequency that deters animals away from landing pad 1. This would keep animals from nesting on or near landing pad 1.

Figure 4:
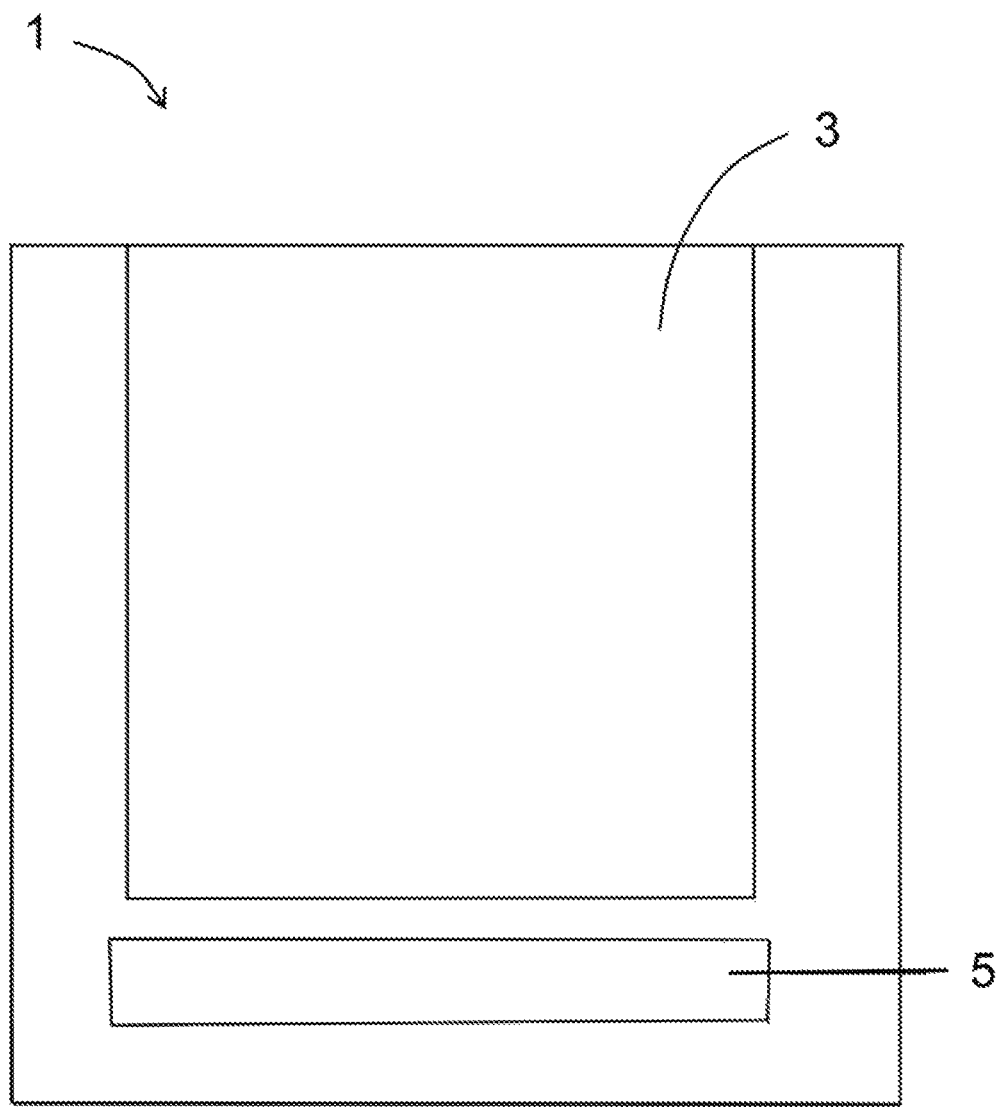
FIG. 4 is a bottom view of the landing pad in FIG. 1.

FIG. 4 is a bottom view of land pad 1. It shows electronic housing 5 and storage compartment 3.

Figure 5A:
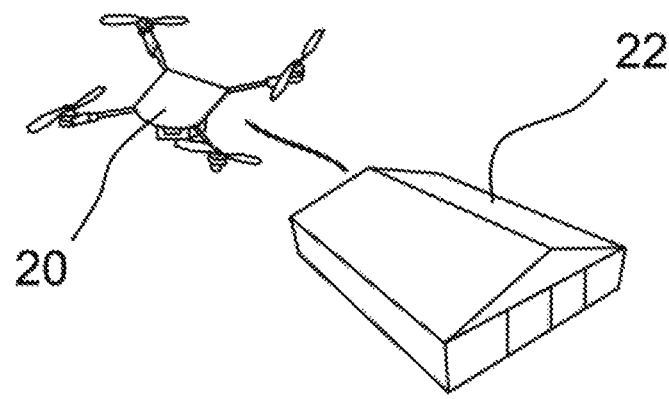
FIGS. 5A, 5B and 5C depict the stages of drone delivery.
Figure 5B:
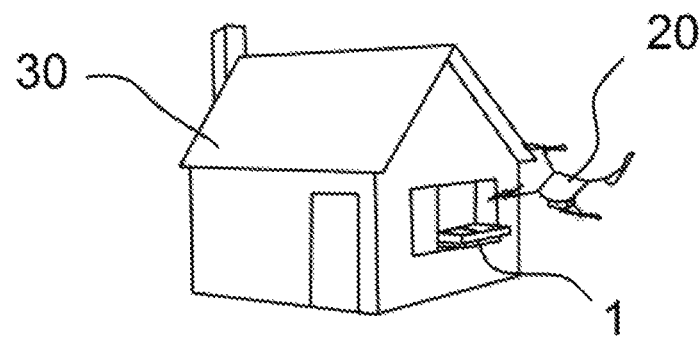
Figure 5C:
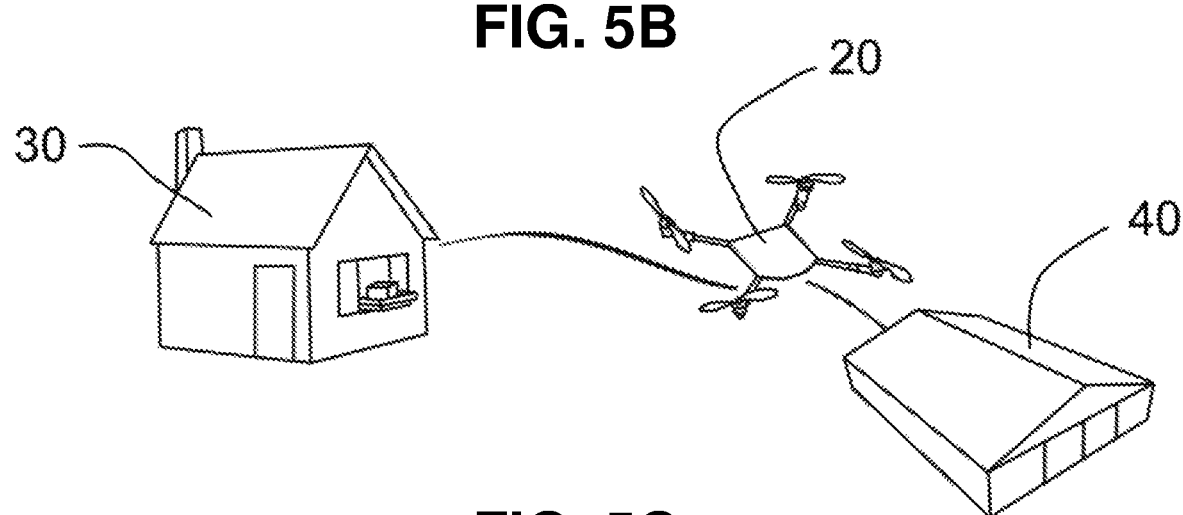

FIGS. 5A, 5B and 5C depict the steps of the drone delivery method. FIG. 5A depicts drone 20 with proper data relayed or stored, departing distribution facility 22 with package 25 (see FIG. 6A).

FIG. 5B shows that upon travel to recipients location 30, drone 20 will conduct the proper identification of landing pad 1 and, following a successful exchange of credentials, approaching the landing pad 1 (see FIGS. 6A, 6B, 7A, 7B and 7C) and delivering the package. FIG. 5C shows drone 20 traveling back to subsequent destination 40, whether that is an original distribution facility 22 or another location.

Figure 6A:
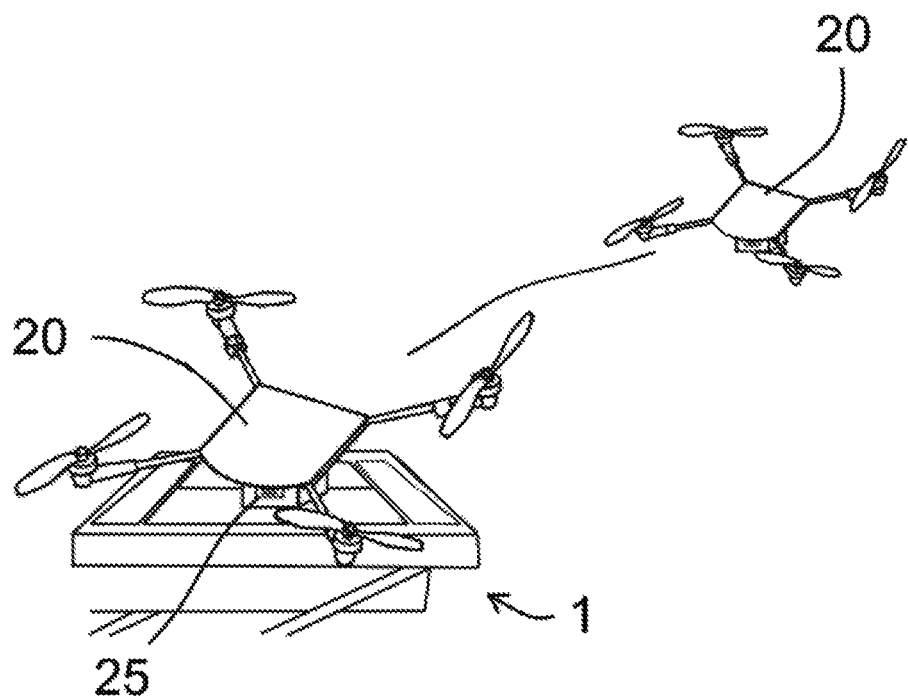
FIGS. 6A and 6B depict the actual delivery of the package to the landing pad.
Figure 6B:
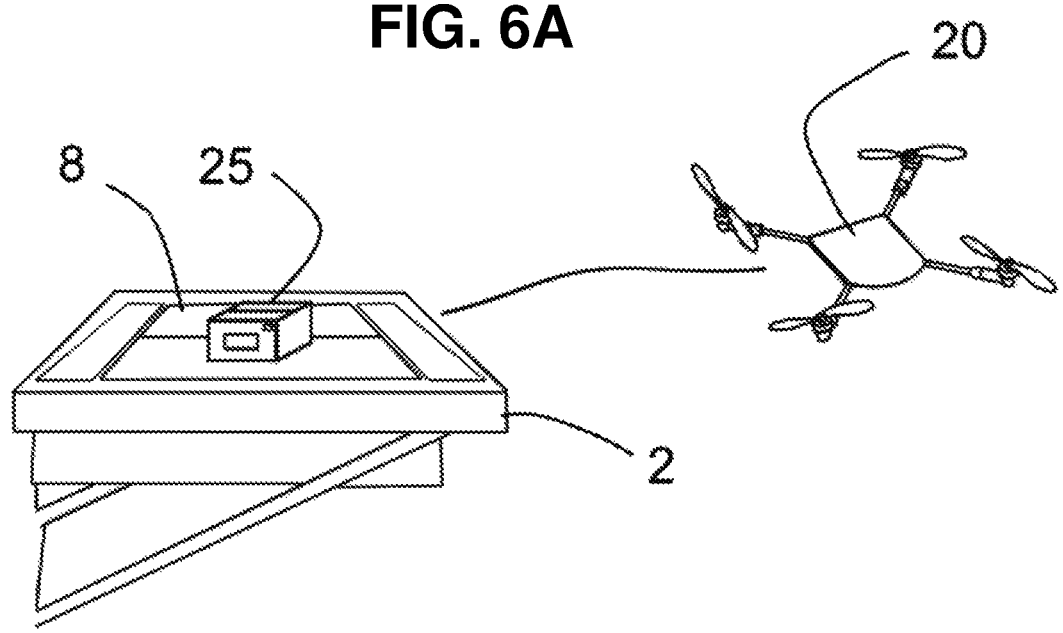

FIGS. 6A and 6B depict the function of landing pad 1 upon successful credential transfer between drone 20 and landing pad 1 and the subsequent approach of drone 20 to landing pad 1.

FIG. 6Aa shows drone 20 landing upon landing platform 2. Drone 20 then releases package 25 as shown in FIG. 6B and continues to subsequent destination 40 (not shown). The package remains on landing platform 2 until trapdoor 8 opens.

Figure 7A:
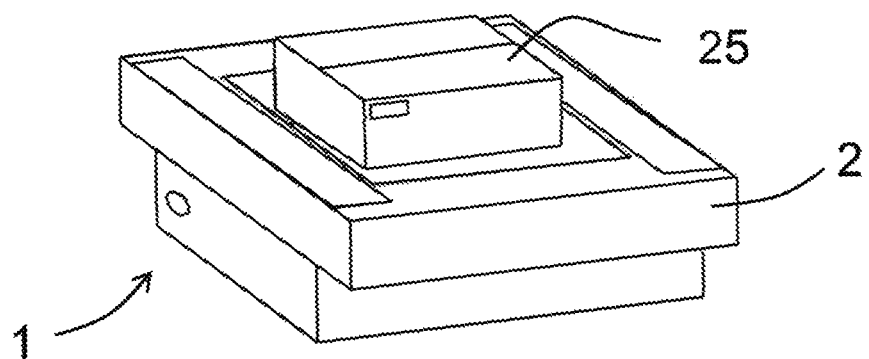
FIGS. 7A, 7B and 7C depict the use of the landing pad.
Figure 7B:
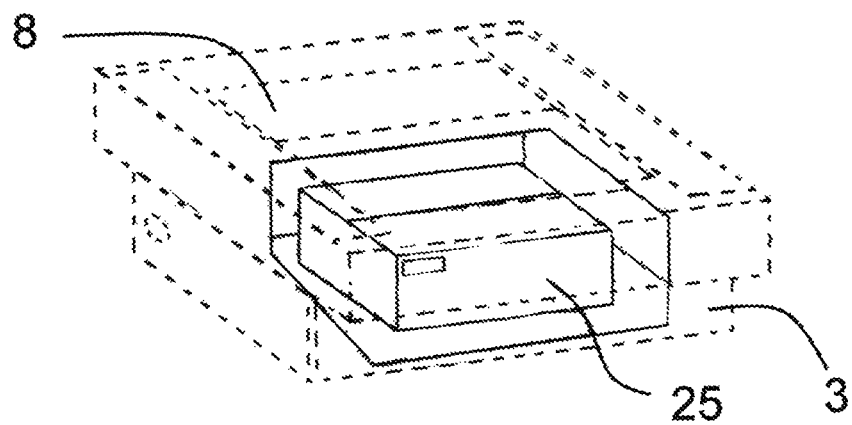
Figure 7C:
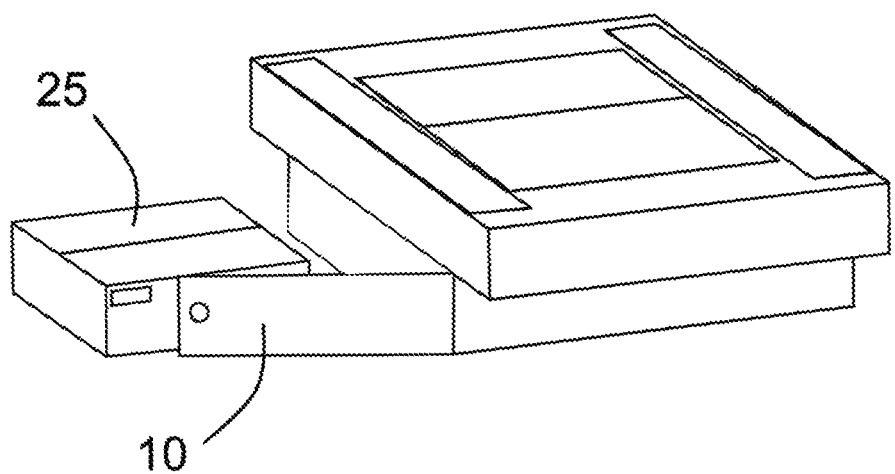

FIGS. 7A, 7B and 7C depict the steps of package 25 being left on landing platform 2 after successful delivery from drone 20 (see FIG. 7A), package 25 entering storage compartment 3 via trapdoor 8 (see FIG. 7B), and package 25 being removed by a user via storage door 10 (see FIG. 7C).

Whether notified by drone 20 or whether it senses the package via internal sensors, landing pad 1, aware that package 25 is upon landing platform 2, opens trapdoors 8 causing package 25 to drop into storage compartment 3. In some embodiments, before package 25 is delivered, a signature is obtained from the addressee and/or landing pad owner. This signature can be obtained physically and/or electronically such as via an email authorization. This added level of security allows for a single landing pad to be used by several unrelated individuals without the fear of others receiving valuable/and or personal deliveries.

Figure 19A:
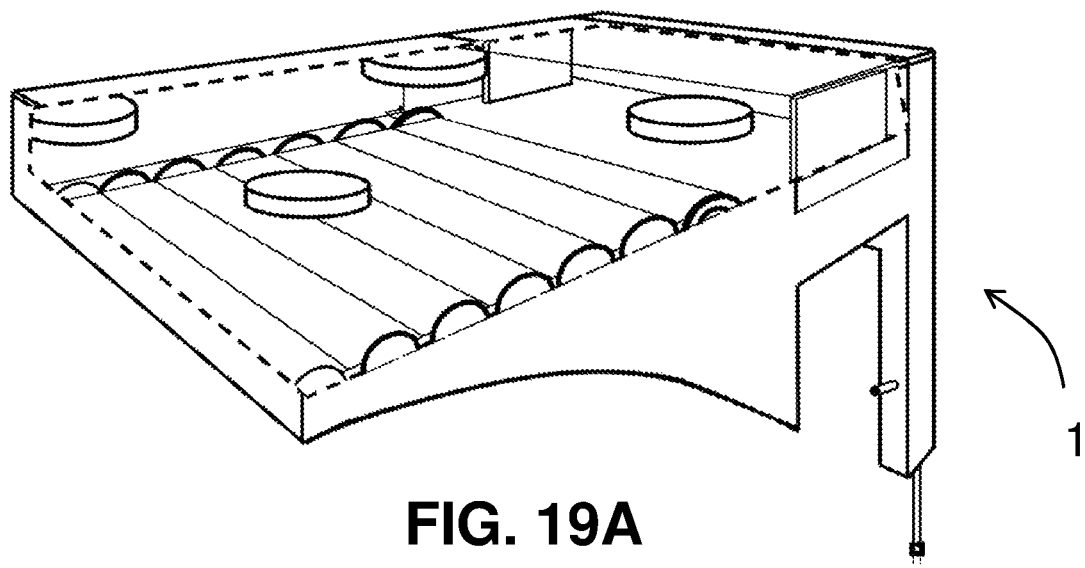
FIG. 19A is a perspective view of a landing pad that doubles as a wireless charging station.

FIG. 19A illustrates landing pad 1 configured to operate as a wireless charging station.

Figure 19B:
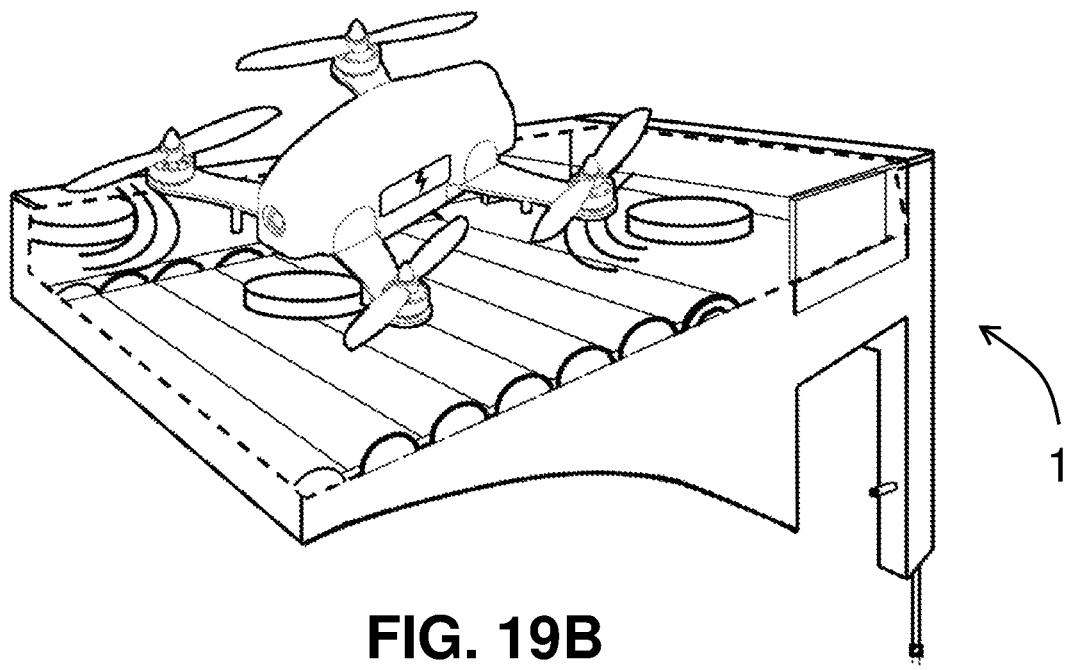
FIG. 19B is a perspective view of a landing pad that doubles as a wireless charging station charging a drone.

FIG. 19B illustrates landing pad 1 wirelessly charging a drone.

Figure 20A:
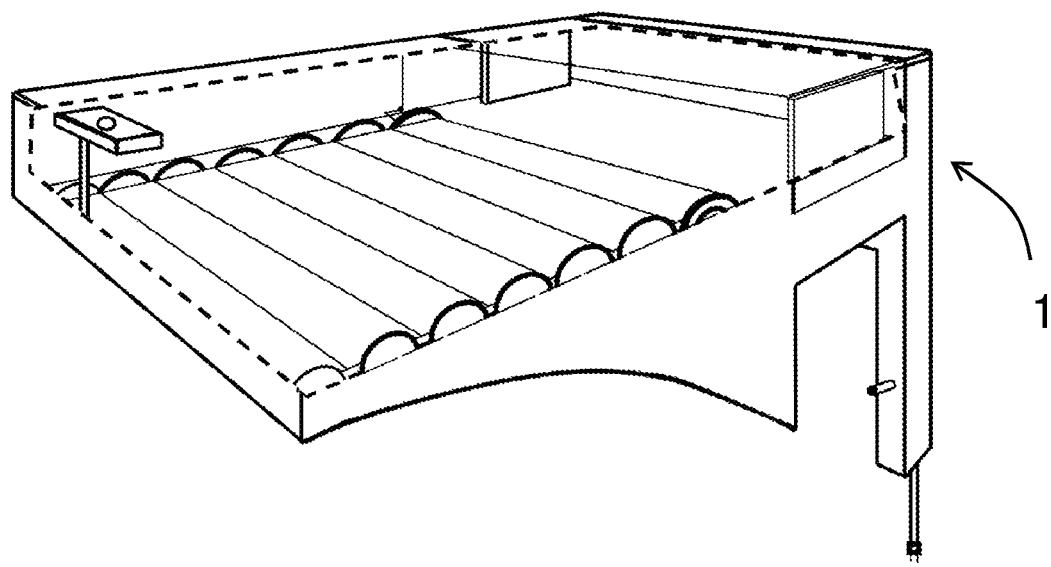
FIG. 20A is a perspective view of a landing pad with a charging plug.

FIG. 20A illustrates landing pad 1 configured to operate as a charging station.

Figure 20B:
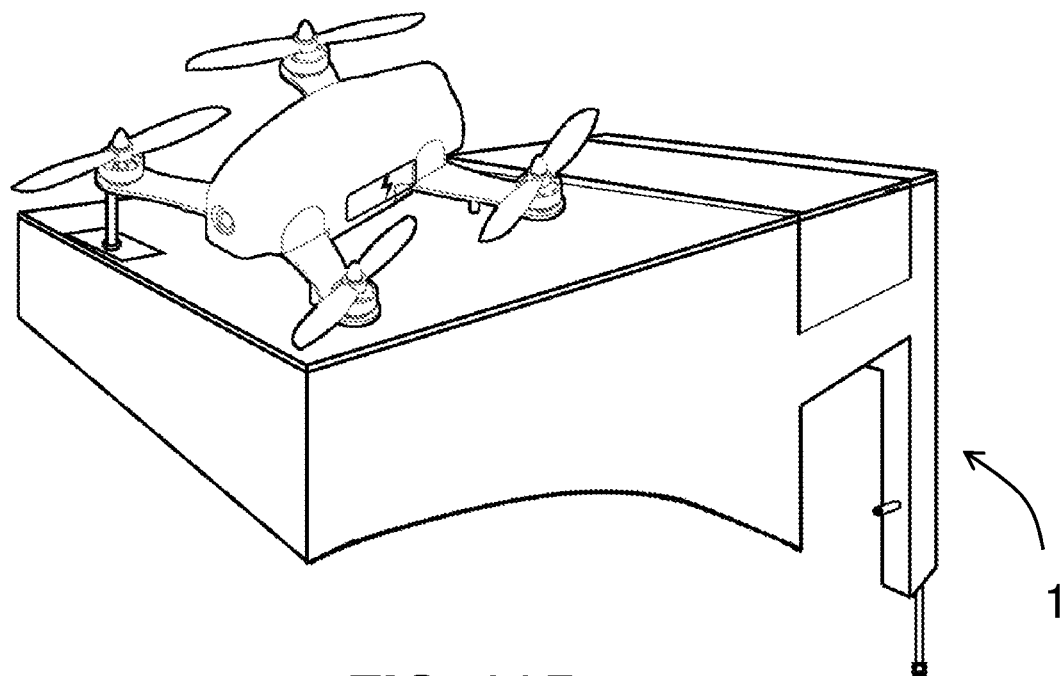
FIG. 20B is a perspective view of a landing pad with a charging plug charging a drone.

FIG. 20B illustrates landing pad 1 charging a drone.

In some embodiments, landing pad is configured to be used with an application that can run on, among other things, a smartphone, tablet, laptop, and/or personal computer. In some embodiments the application confirms package deliveries and/or pickups. The application can also allow an individual to sign for deliveries and/or pickups. In some embodiments, the application also allows the user to modify various setting on the landing pad such as its internal climate.

In some embodiments a notification is sent to a recipient of the successful delivery by means of text message, email, or notification on a smartphone application in conjunction with an LED or digital display on landing pad 1.

FIG. 7C depicts the recipient unlocking and opening storage door 10 and removing package 25 from the storage compartment 3.

Figure 8:
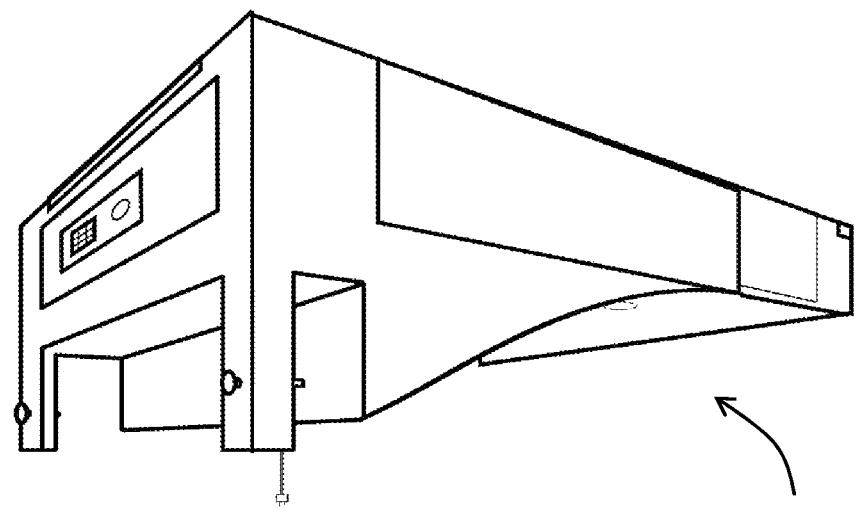
FIG. 8 is a perspective view of the front of a landing pad according to some embodiments.

FIG. 8 shows landing pad 1 configured to be placed in a window.

Figure 9:
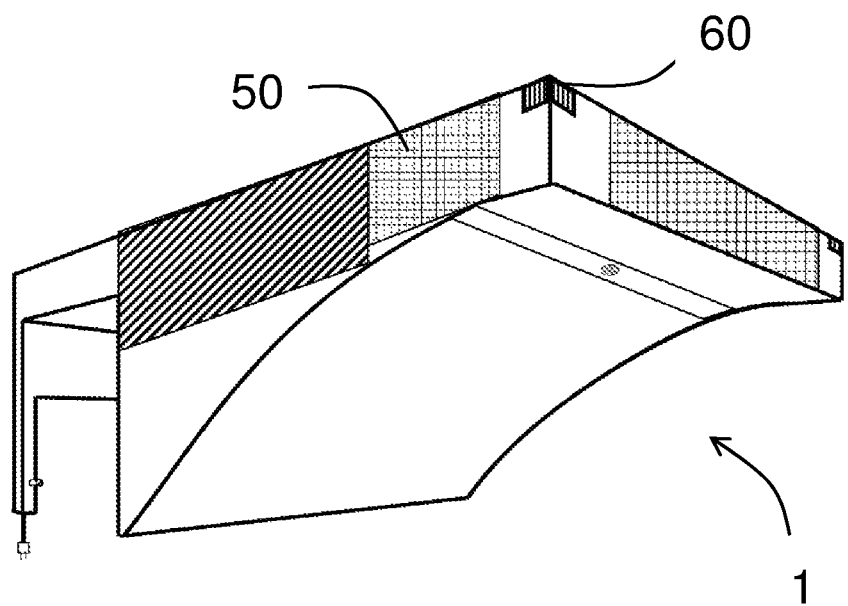
FIG. 9 is a perspective view of the back of a landing pad according to some embodiments.
Figure 10:
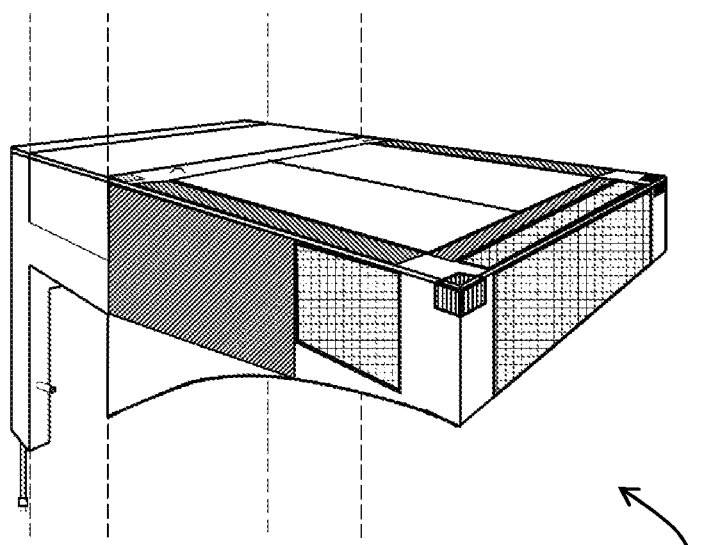
FIG. 10 is a perspective view of a landing pad in a window.
Figure 11:
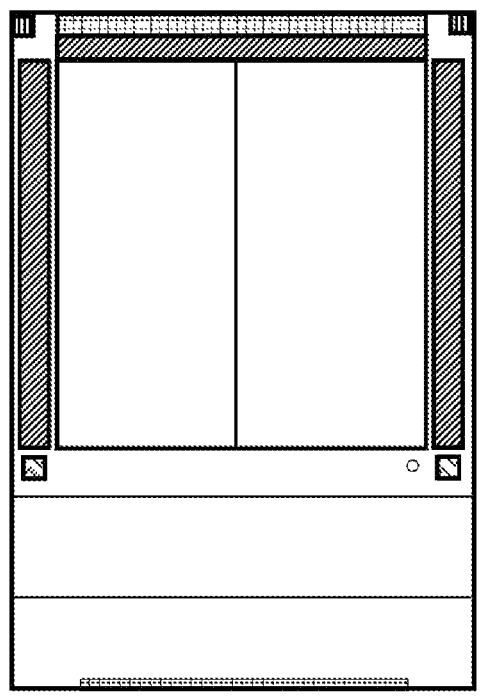
FIG. 11 is a top view of a landing pad according to some embodiments.

FIG. 9 illustrates, among other things, landing pad 1 with sound emitter 50 and transmitter 60.

Figure 12:
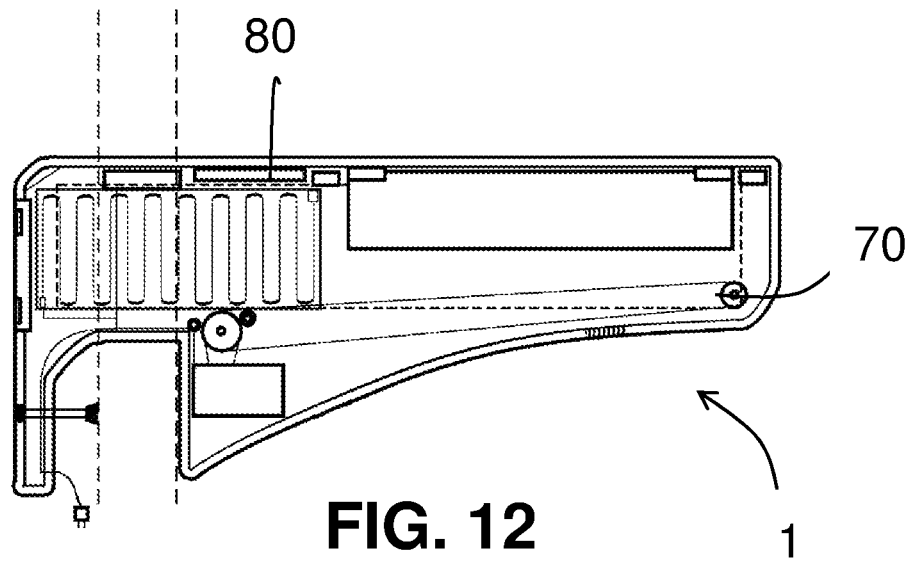
FIG. 12 is a side cutaway view of a landing pad with a conveyor belt.
Figure 13:
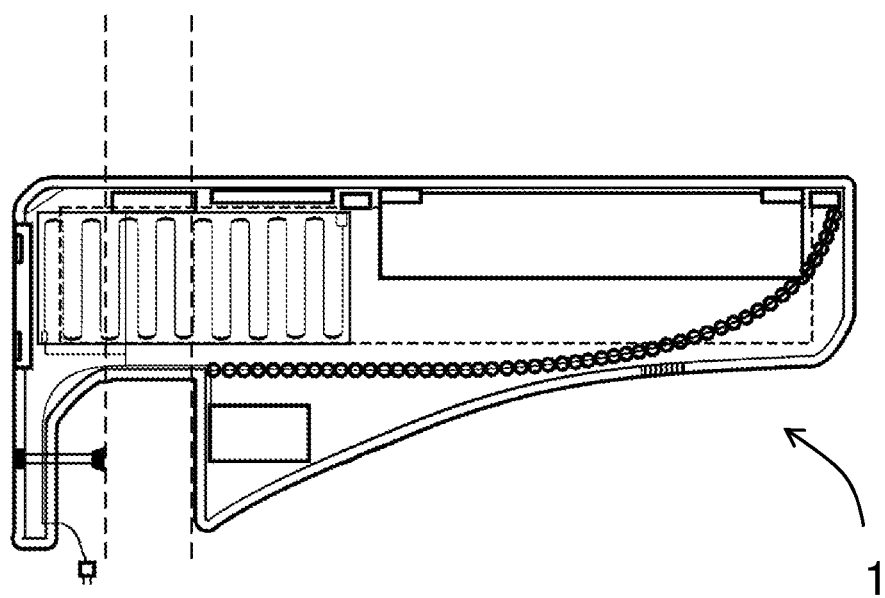
FIG. 13 is a side cutaway view of another embodiment of a landing pad.
Figure 14A:
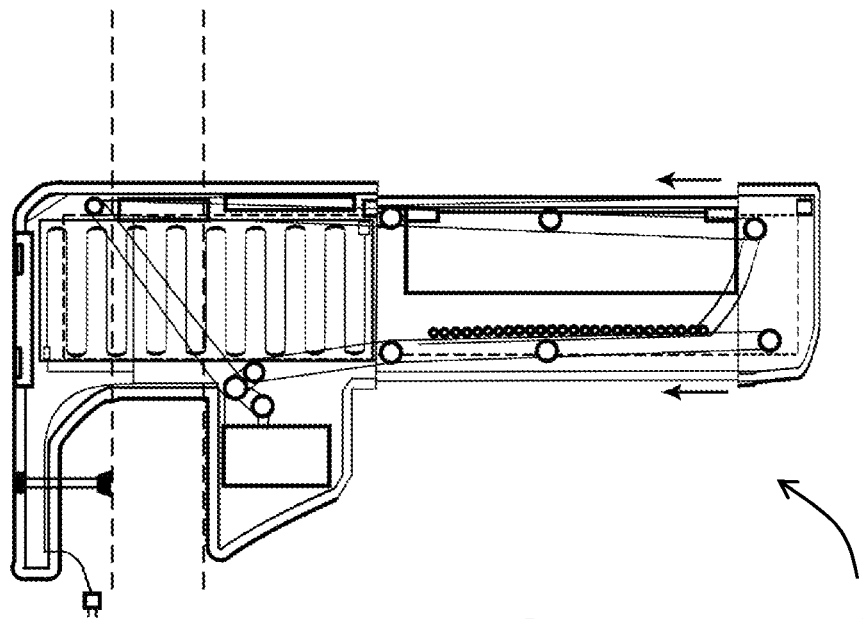
FIG. 14A is a side cutaway view of an expandable landing pad in an expanded state.
Figure 14B:
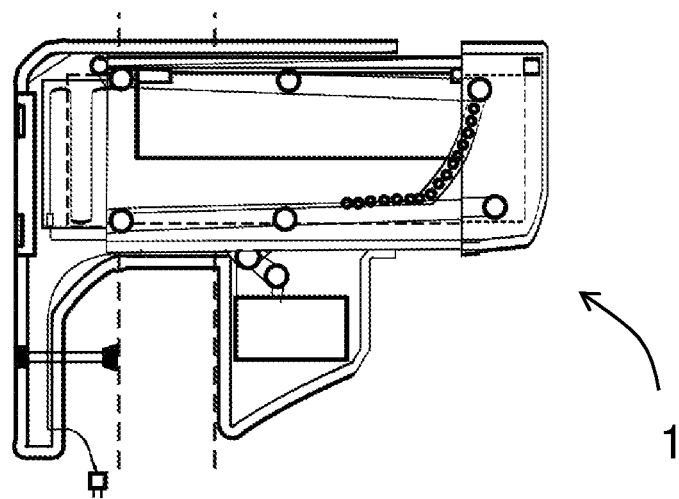
FIG. 14B is a side cutaway view of an expandable landing pad in a contracted state.
Figure 15:
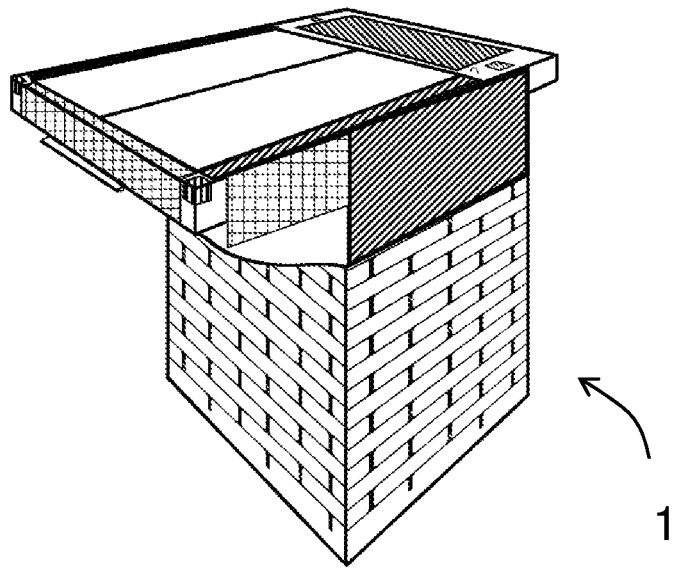
FIG. 15 is a front perspective view of a landing pad configured to be used on a rooftop.
Figure 16:
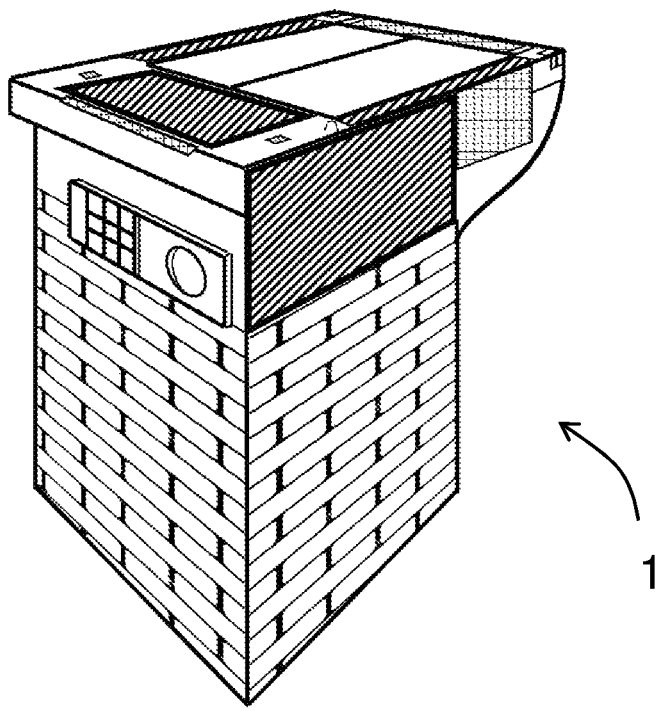
FIG. 16 is a back perspective view of a landing pad configured to be used on a rooftop.
Figure 17:
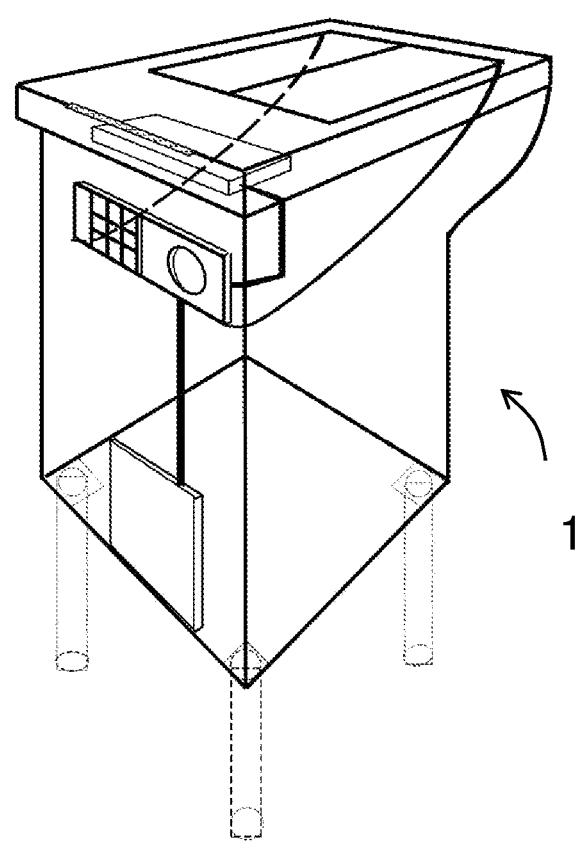
FIG. 17 is a perspective view of a landing pad configured to be used in a field.

FIG. 12 illustrates, among other things, landing pad 1 with conveyer belt 70 and climate control mechanism 80.

While particular elements, embodiments and applications of the present invention have been shown and described, it will be understood, that the invention is not limited thereto since modifications can be made without departing from the scope of the present disclosure, particularly in light of the foregoing teachings.

What is claimed is:

1. A method of delivering a package via a drone capable of transmitting a first signal recognizable by a receiver associated with a landing pad and recognizing a unique ID signal sent from said landing pad, wherein said method comprises:
    (a) loading said drone with said package;
    (b) employing a global positioning system device and the unique ID signal of said landing pad to navigate said drone to said landing pad, wherein said landing pad comprises a landing platform with a trapdoor in a normally closed position and a storage compartment with a floor and a conveyor belt and a hydraulic system configured to tilt said floor;
    (c) opening said trapdoor of said landing platform upon receipt of said first signal by said receiver to expose an interior of said storage compartment; and
    (d) actuating a mechanism operatively associated with said drone to transfer said package into said storage compartment.

2. The method of claim 1, further comprising:
    (e) positioning said landing pad in a window of a residence.

3. The method of claim 2, further comprising:
    (f) folding said landing pad into said window when not interacting with said drone.

4. The method of claim 1, wherein said storage compartment further comprises a storage compartment door with a lock.

5. The method of claim 4, further comprising:
    (e) biasing said storage compartment door to a closed position using said lock.

6. The method of claim 1,
    wherein said Unique ID is encrypted.

7. The method of claim 6, further comprising:
    (f) providing said drone with a unique drone ID.

8. The method of claim 1, further comprising:
    (e) charging said landing pad.

9. The method of claim 8, wherein said landing pad is charged via a power cord connectable to an electrical outlet.

10. The method of claim 1, further comprising:
    (e) tilting said floor of said storage compartment with said hydraulic system.

11. The method of claim 1, further comprising:
    (e) using said landing pad to charge said drone.

12. The method of claim 11, wherein said landing pad charges said drone via inductive charging.

13. The method of claim 1, further comprising:
    (e) sending a confirmation to a third party when said drone delivers a package to said landing pad.

14. The method of claim 13, wherein said confirmation is sent via an email.

15. The method of claim 1, further comprising:
    (e) configuring said drone to determine at least one physical property of said package being delivered.

16. The method of claim 15, further comprising:
    (f) transmitting a plurality of information related to said at least one physical property of said package to said landing pad; and
    (g) adjusting a plurality of climate control mechanisms of said storage compartment in response to said at least one physical property of said package.

17. The method of claim 16, wherein said plurality of climate control mechanisms can adjust an at least one temperature setting, an at least one humidity setting and an at least one light setting of said storage compartment.

18. The method of claim 16, wherein said plurality of climate control mechanisms includes a heating unit, a cooling unit, a humidifier, a dehumidifier and an adjustable light source.

19. The method of claim 17, further comprising:
    (h) maintaining said plurality of climate control mechanisms to provide a plurality of optimal storage conditions for said package when housed in said storage compartment.

20. The method of claim 1, further comprising:
    (e) equipping said landing pad with a sound emitter capable of deterring animals from interacting with said landing pad and said drone; and
    (f) emitting said sound from said landing pad.

* * * * *